H. ESSEX.
Machines for Dressing Metal Cocks.

No. 144,524. Patented Nov. 11, 1873.

Witnesses.
E. A. Bates.
Phil C. Masi.

Inventor
Henry Essex.
Chipman Hosmer & Co
Attys

UNITED STATES PATENT OFFICE.

HENRY ESSEX, OF MEADVILLE, PENNSYLVANIA.

IMPROVEMENT IN MACHINES FOR DRESSING METAL COCKS.

Specification forming part of Letters Patent No. 144,524, dated November 11, 1873; application filed September 13, 1873.

*To all whom it may concern:*

Be it known that I, HENRY ESSEX, of Meadville, in the county of Crawford and State of Pennsylvania, have invented a new and valuable Improvement in Machines for Boring Out and Turning Off of Metal Cocks; and I do hereby declare that the following is a full, clear, and exact description of the construction and operation of the same, reference being had to the annexed drawings, making a part of this specification, and to the letters and figures of reference marked thereon.

Figure 1:
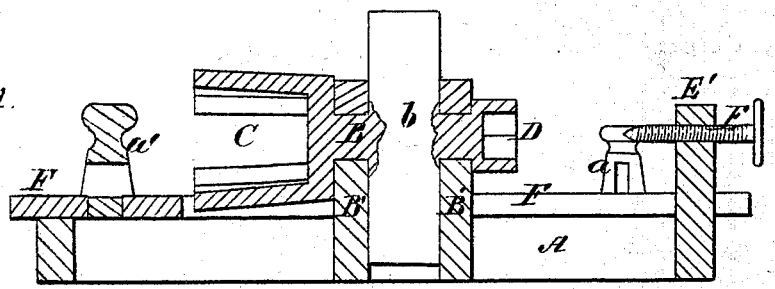
Figure 2:
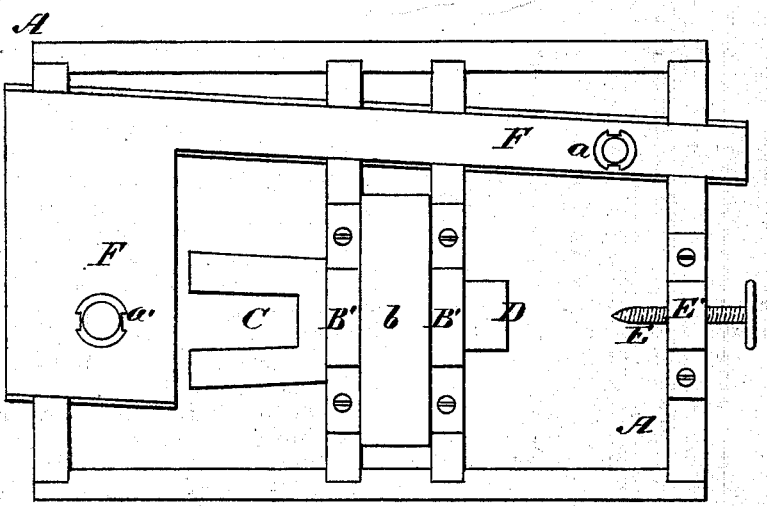

Figure 1 of the drawings is a representation of a vertical section of my lathe. Fig. 2 is a top view of same.

The object of this invention is to construct a lathe which is designed for boring out the bodies of metal cocks and turning off the surfaces of tapered plugs which are adapted to fit therein. It consists in combining with a spindle, which carries on its ends means for holding the bodies of the cocks and the plugs thereof, a reciprocating carriage, on which tool-posts are applied, which carriage is set at an angle to the axis of said spindle corresponding to the taper of the hole through the cocks and the surfaces of the plugs.

In the annexed drawings, A represents the frame of the lathes; B, a spindle, having its bearings in transverse blocks B' B', and carrying holders C D on its extremities, one of which, C, is intended to receive the bodies of the cocks, and the other, D, the prismatic ends of the plugs thereof, as indicated in dotted lines, Fig. 2. On spindle B a pulley, b, is keyed, to which rotary motion is imparted from any convenient prime mover through the medium of a belt. Opposite the plug-holder D is a centering tail-screw, E, which is tapped through a bearing, E', on frame A, and opposite the cock-holder C is a post, a', for holding a boring-tool. Alongside of the plug, when it is in place between its holder D and tail-screw E, is another post, a, for holding the tool which turns off and trues the surfaces of the plugs that fit into the bodies of the cocks. F is a reciprocating carriage on which the tool-posts a a' are fixed, which carriage is guided by frame A and arranged therein at an angle to the longitudinal axis of the spindle B, which exactly corresponds to the angle or bevel of the bore of the cock-body and the plug which is to fit therein; consequently the said bore and plug will have the same taper if turned by the means described, as both tools travel at the same angle with respect to the spindle B.

The carriage F may be reciprocated by means of a screw placed beneath it or alongside of it, or by any other suitable means usually employed in lathes for moving tool-rests.

What I claim as new, and desire to secure by Letters Patent is—

The angularly-movable carriage or tool-rest F, combined with cock and plug holders C D, as and for the purposes described.

In testimony that I claim the above I have hereunto subscribed my name in the presence of two witnesses.

HENRY ESSEX.

Witnesses:
 GEO. O. MORGAN,
 EMERSON ELLSWORTH.